J. ROEDER.
MOTION PICTURE APPARATUS.
APPLICATION FILED AUG. 18, 1915.

1,196,812.

Patented Sept. 5, 1916.
2 SHEETS—SHEET 1.

Inventor
John Roeder

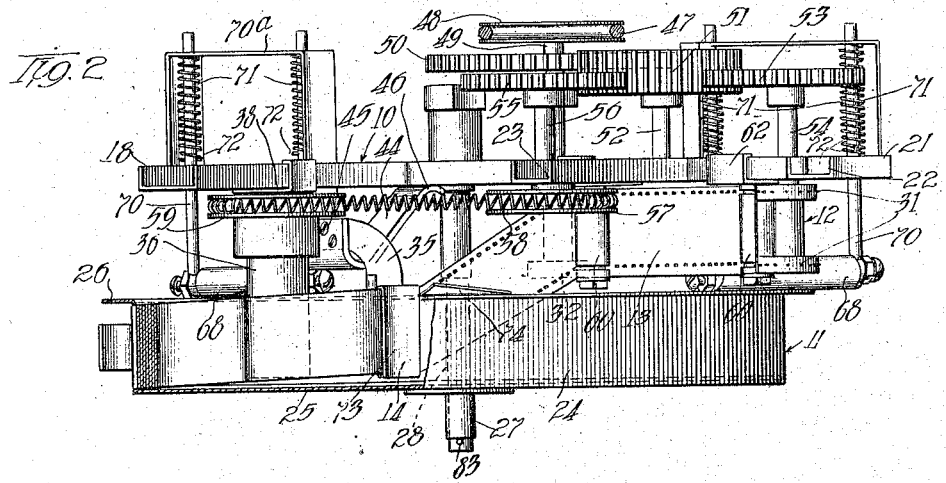
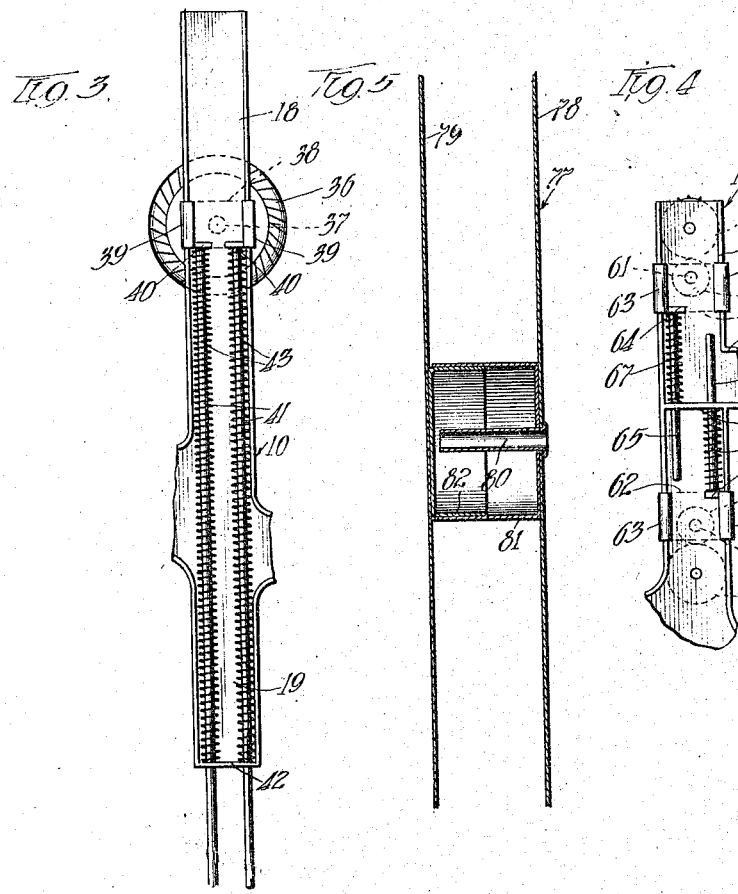

UNITED STATES PATENT OFFICE.

JOHN ROEDER, OF CHICAGO, ILLINOIS, ASSIGNOR TO HARRY H. FEILCHENFELD, OF CHICAGO, ILLINOIS.

MOTION-PICTURE APPARATUS.

1,196,812.  Specification of Letters Patent.  Patented Sept. 5, 1916.

Application filed August 18, 1915. Serial No. 46,120.

*To all whom it may concern:*

Be it known that I, JOHN ROEDER, a citizen of the United States, residing at Chicago, in the county of Cook and State of Illinois, have invented new and useful Improvements in Motion-Picture Apparatus, of which the following is a full, clear, concise, and exact description, reference being had to the accompanying drawing, forming a part of this specification.

My invention relates to motion picture apparatus and more specifically to means for reeling up the film after it has been displayed.

Among the objects of my invention is to provide improved means for reeling up the film which will obviate the necessity of rewinding the film from the take-up roll.

Further objects will appear from the description to follow taken in connection with the appended claims.

Figure 1:
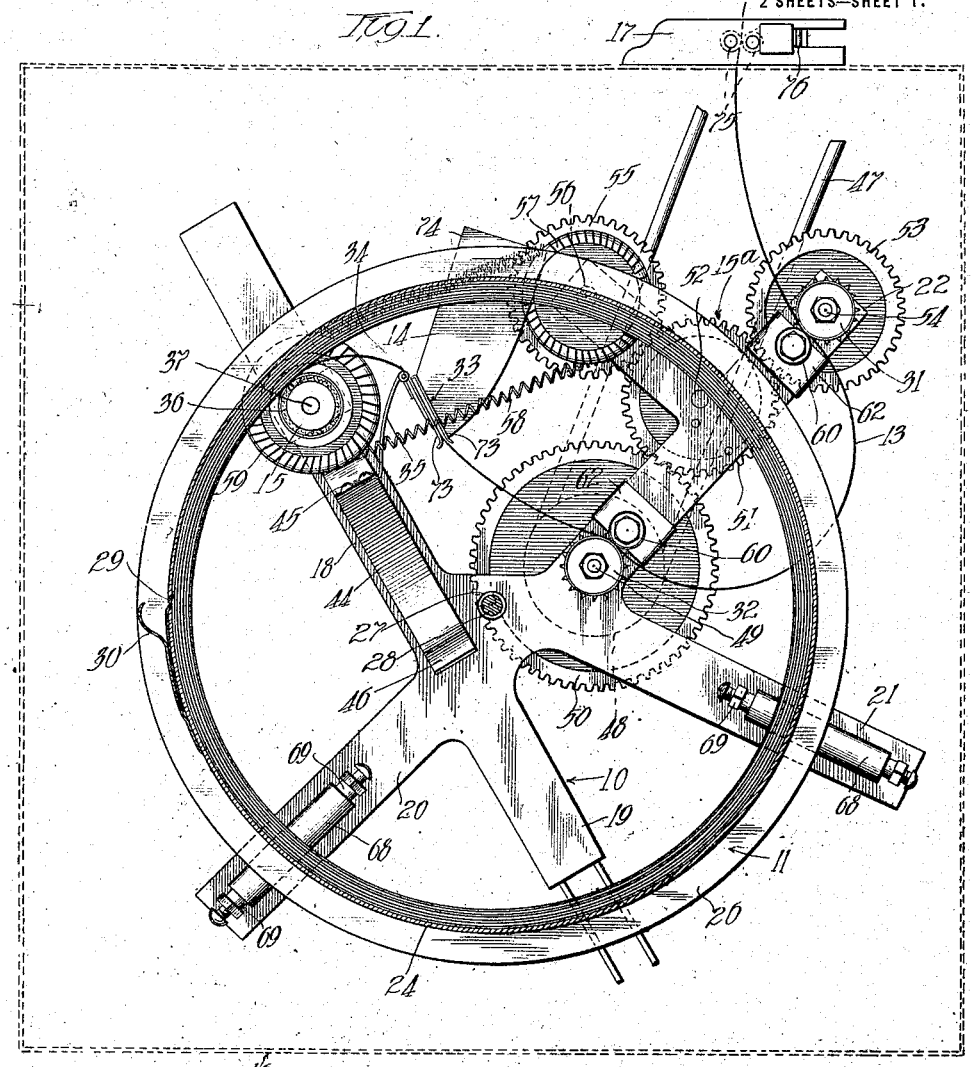
Figure 6:
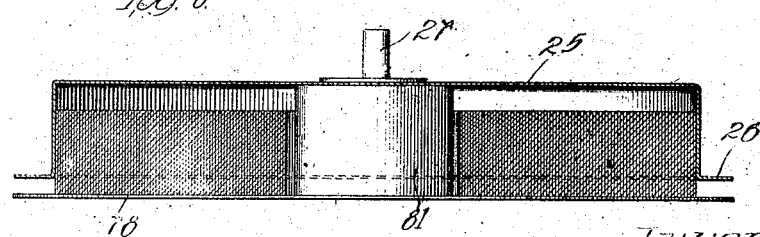

In the drawings, in which I have shown one embodiment of my invention—Figure 1 is a side elevation of my improved take-up device showing the inclosing casing in dotted lines; Fig. 2 is a plan view of the take-up device, parts being broken away to show the interior construction; Fig. 3 is a detail of part of the supporting bracket and the slidably mounted friction roller; Fig. 4 is a detail of part of the bracket and the spur feed mechanism; Fig. 5 is an axial cross section of a supply reel used with my improved take-up reel; and Fig. 6 is a sectional view showing the manner in which the film is shifted from the take-up reel to the supply reel.

Referring now to the drawings in detail the take-up mechanism comprises a support or bracket 10 which supports the entire take-up mechanism and which can readily be substituted for the take-up mechanism now in use by simply inserting it in the casing provided for the take-up mechanism, a rotatable casing 11 forming a take-up reel, film feeding mechanism 12 for positively advancing the film 13 as it passes from the cameragraph mechanism, film guiding mechanism 14 for guiding the film from the feeding mechanism 12 into the rotatable casing or reel 11, and mechanism 15 for causing the film to be reeled up inside of the casing 11 and for causing the casing 11 to rotate, and mechanism 15ª for driving the film feeding mechanism 12 and mechanism 15.

I have shown the take-up mechanism as mounted in a casing or housing, indicated in dotted lines at 16, and have shown the film 13 as entering this casing through a film valve 17, the casing and film valve, however, forming no part of the invention set forth in this application.

The support or bracket 10 comprises arms 18 and 19 on which the mechanism 15 is slidably mounted, arms 20 and 21 on which the guide rollers for the casing 11 are rotatably mounted and arms 22 and 23 on which the film feeding mechanism 12 and driving mechanism 15ª are mounted. These arms are all U-shaped in cross section as shown in Fig. 2 to give strength to the bracket and to form a housing for certain parts of the mechanism. The rotatable casing or reel 11 comprises a shallow cylindrical portion 24 closed on one side as shown at 25 (Fig. 2) and open on the other side to permit the film to be guided inside of the cylindrical portion. The casing is provided with a flange 26 for engagement with the guide rollers which hold the casing in position and cause it to run true, and a tubular bearing member 27 which is mounted on a stud or shaft 28 secured to the bracket 10 whereby the casing is rotatably mounted on the bracket. The cylindrical portion 24 is provided with a slot 29 (Fig. 1) through which the end of the film is inserted, and is also provided with a spring clip 30 beneath which the end of the film is secured to firmly fasten the film to the casing or reel. The film feeding mechanism 12 comprises two sets of spur feed wheels 31 and 32 between which the film extends in the form of a loop as shown in Fig. 1, whereby the film is caused to enter the casing 11 without undue bending or distortion.

The film guide mechanism 14 comprises a guide member 33 which is pivotally mounted as shown at 34 on a support or bracket 35 which is mounted on the slide which carries the mechanism 15. The mechanism 15, for causing the film to be reeled up inside of the casing 11, comprises a friction roller 36 (the surface of which may be formed of any suitable material such as a soft rubber composition which will not injure or blur the film) rotatably mounted on a shaft or stud 37 which is secured on a support 38 slidably mounted on the arm 18 of the bracket 10. The support 38 is provided with wing portions 39 which extend around and embrace the arm 18; lugs 40 extend from these wings 39 and to these lugs are secured rods 41 which extend through guide openings in a web 42 formed on the arm 19. Springs 43 surround the rods 41 and engage the lugs 40 tending to hold the sliding support in its uppermost position to hold the friction roller 36 against the film within the casing 11. The support 38 is provided with an extension 44 (to which the support 35 is secured) the end of which slidably engages the arm 18, as shown at 46, to hold the roller 36 properly against the film and prevent the outer end of the roller from sagging. The drive mechanism 15ᵃ comprises a belt 47 which is driven from the cameragraph, a pulley 48 driven by this belt, a shaft 49 on which the pulley 48 is secured, a spur gear 50 also secured on the shaft 49, a wide faced spur gear 51 meshing with the gear 49, a shaft or stud 52 on which the gear 51 is mounted, a gear 53 meshing with the gear 52, a shaft 54 on which the gear 53 and spur feed wheels 31 are secured, a gear 55, a shaft 56 mounted in suitable bearings in the bracket 10 and on which the gear 55 is secured, a sprocket or pulley 57 secured on the shaft 56, a flexible driving member 58 which may be formed from a continuous coiled spring, the coils of which engage recesses in the periphery of the sprocket or pulley 57, and a sprocket or pulley 59 similar to the sprocket 57 which is driven by the flexible member 58 and secured so as to cause the roller 36 to rotate with it. A pair of guide rollers 60 are provided for holding the reel against the teeth of the spur feed wheels 31 and 32. These rollers are mounted on studs 61 secured to supports 62 which are slidably mounted on the arm 22, by means of wing portions 63 extending around the arm. One of these wing portions is provided with a lug 64 to which is secured a rod 65 which extends through an opening in a web 66 on the arm 22. A spring 67 surrounds the rod 65 and bears against the lug 64 to hold the roller 60 against its spur wheel. Two pressure rollers 68 are provided for holding the film within the casing 11 and for engaging the flange 26 of the casing to cause the latter to run true. These rollers 68 are rotatably mounted in bearings 69 which are secured to the rods 70 slidably mounted in openings in the bracket 10 and bracket 70ᵃ which is secured to the bracket 10. Springs 71 are provided for holding the rollers 68 against the flange 26, these springs engaging the bracket 70ᵃ and bearing against pins 71 in the rods 70. The guide member 33 comprises two parallel leaf portions 73 between which the film extends, and a wing portion 74 which extends upwardly to engage the edges of the film which are within the casing 11 to prevent them from slipping out of the casing.

The film valve 17 comprises a pair of rollers 75 one of which is pressed against the other by means of a spring 76 and between which rollers the film is led into the casing 16. The supply reel 77 (Figs. 5 and 6) from which the film is fed to the cameragraph is so constructed that the film, after it has been reeled up inside of the casing 11, may be slipped from the casing 11 onto the reel 77 without any necessity for rewinding the film. To accomplish this result the reel is made of two separable portions which have a telescopic connection with each other. The reel comprises two flanges 78 and 79 between which the film is received, a tubular bearing member 80 secured to the flange 78 and two telescoping cup shaped members 81 and 82 secured to the flanges 78 and 79 respectively. The casing 11 may be held on the stud 28 in any suitable manner as by means of a pin 83 (Fig. 2).

The use and operation of my improved apparatus is as follows: The end of the film from the supply reel is threaded between the rollers 75 of the film valve into the casing 16 and the film is then placed in position between the spur feed wheels 31 and 32 and their corresponding pressure rollers 60 as shown in Fig. 1, the film being slack between the two rollers to give it the right direction to enter the casing 11 without unduly bending or distorting the film. The end of the film is then inserted through the opening 29 in the casing 11 and secured beneath the spring clip 30 to hold it securely on the casing 11. The casing 11 is then slipped in place on the shaft 28, the film 13 being placed between the cylindrical portion 24 of the casing 11 and the friction roller 36, the film at the same time being placed between the leaf portions 73 of the guide 33. The casing 11 is then secured in place on the stud 28 in any suitable manner as by inserting the pin 83 through the end of the stud 28. The machine is then put in operation to feed the film through the cameragraph. This operation of the machine drives the belt 47 which in turn causes the feed wheels 31 and 32 to be operated through the intermediate driving mechanism including the driving shaft 49, spur gears 50, 51 and 53 and the shaft 54. This operation of the spur wheels 31 and 32 causes the web to be advanced at exactly the same rate at which it is fed through the cameragraph. The film which is thus advanced by means of the spur wheels 31 and 32 is taken up and reeled up inside of the casing 11 by means of the friction roller 36 which is also driven from the belt 47 through intermediate driving mechanisms including the pulley 48, shaft 49, spur gears 50, 51 and 55, shaft 56, sprocket or pulley 57, flexible driving member 58 and the sprocket or pulley 59. This rotation of the roller 36 causes the film 13 to be reeled up snugly inside of the casing 11 and causes the casing 11 to rotate as the film is reeled up. The guide member 33 guides the film onto the roller 36 in a manner which prevents the film being distorted and since this guide is pivoted to the support on which the roller 36 is mounted it travels inwardly along with the roller 36 and accommodates itself to the position assumed by the film.

After the film has been run through the cameragraph and wound up within the casing 11 the casing containing the film is slipped off of the stud 28, the end of the film is freed from the clip 30 and the entire film is slipped out of the casing 11 onto the special supply reel 77 as shown in Fig. 6. The casing 11 is made large enough so that when a standard length film is reeled up inside of it the opening at the center part of the film will be large enough to receive the cup shaped member 81, as shown in Fig. 6. After the film has been placed in position as shown in Fig. 6 the casing 11 is removed and the cup shaped member 82 is slipped inside of the cup shaped member 81 so that the film will be located and held in place between the flanges 78 and 79. This special supply reel 77 can then be placed in the cameragraph in position to supply the film to the machine.

It will be noted that with my improved take-up mechanism it is not necessary to rewind the film from the take-up reel onto a supply reel, but that the film can simply be slipped from the take-up reel onto the supply reel. This makes the films last much longer as the rewinding is hard on the films. It also saves the labor and time of rewinding and enables one man to operate the machine, as the film is reeled up in such a manner that it is ready to be again placed in a supply reel as soon as it has been run through the machine.

Having thus described my invention what I claim as new and desire to secure by Letters Patent is:—

1. In motion picture apparatus the combination with means for feeding the film from a reel, of means for reeling up said film in superposed layers, said reeling means including means whereby each layer is superposed inside the preceding layer, said last means including rotatable friction means for engaging the film, said feed mechanism including two sets of spaced spur feed wheel mechanisms and means for driving said two sets at the same speed whereby a uniform loop of film may be maintained between said two sets.

2. In apparatus of the class described a rotatable hollow cylindrical container and means for reeling up a film inside of said container and superposing each layer inside the preceding layer, said means including a friction roller for engaging the film, a radially movable support on which said roller is mounted, and a guide movable with said support for directing the film onto said roller, said guide having portions engaging both sides of said film and being freely pivoted to accommodate itself to the direction in which the film extends.

3. In apparatus of the class described a rotatable hollow cylindrical container and means for reeling up a film inside of said container and superposing each layer inside the preceding layer, said means including a friction roller for engaging the film, a radially movable support on which said roller is mounted, and a guide movable with said support for directing the film onto said roller, said guide having portions engaging both sides of said film and being freely pivoted to accommodate itself to the direction in which the film extends, said guide having also a portion for engaging the edge of the film to direct it within the container.

4. In apparatus of the class described a rotatable hollow cylindrical container and means for reeling up a film inside of said container and superposing each layer inside the preceding layer, said means including a friction roller for engaging the film, a radially movable support on which said roller is mounted, and a pivoted guide movable with said support for directing the film onto said roller, a rotatable guide member nearer the container axis than the innermost layer of film for directing the film to the pivoted guide.

5. In apparatus of the class described a rotatable hollow cylindrical container rotatable about a substantially horizontal axis and means for reeling up a film inside of said container and superposing each layer inside the preceding layer, said means including a friction roller for engaging the film located adjacent the upper part of the container, a radially movable support on which said roller is mounted, and means for directing the film comprising a member rotatable about a fixed axis nearer the container axis than the innermost layer of film.

6. In apparatus of the class described a rotatable hollow cylindrical container rotatable about a substantially horizontal axis and means for reeling up a film inside of said container and superposing each layer inside the preceding layer, said means including a friction roller for engaging the film located adjacent the upper part of the container, a radially movable support on which said roller is mounted, and means for directing the film comprising a spur feed wheel rotatable about a fixed axis nearer the container axis than the innermost layer of film.

7. In apparatus of the class described a rotatable hollow cylindrical container and means for reeling up a film inside of said container and superposing each layer inside the preceding layer, said means including a friction roller for engaging the film, a radially movable support on which said roller is mounted, and means for directing the film comprising a spur feed wheel rotatable about a fixed axis nearer the container axis than the innermost layer of film, and a spur feed wheel rotatable about a fixed axis outside said container.

8. In apparatus of the class described a rotatable hollow cylindrical container and means for reeling up a film inside of said container and superposing each layer inside the preceding layer, said means including a friction roller for engaging the film, a radially movable support on which said roller is mounted, said container having an open side through which the film enters the container, and a roller for engaging the edge of the container on its open side to cause it to run true and to hold the film in the container.

In witness whereof, I have hereunto subscribed my name.

JOHN ROEDER.